United States Patent [19]

Bunce

[11] Patent Number: 4,501,086
[45] Date of Patent: Feb. 26, 1985

[54] FISH ATTRACTOR VARIABLE SPEED SLIDING ATTRACTOR BLADE

[76] Inventor: William A. Bunce, 355 Overbrook Dr., Folsom, Calif. 95630

[21] Appl. No.: 541,540

[22] Filed: Oct. 13, 1983

[51] Int. Cl.³ .............................................. A01K 85/00
[52] U.S. Cl. ..................................... 43/42.2; 43/42.05
[58] Field of Search ................... 43/42.2, 42.19, 42.16, 43/42.51, 42.05

[56] References Cited

U.S. PATENT DOCUMENTS

| | | | |
|---|---|---|---|
| 167,784 | 9/1875 | Pierce | 43/42.19 |
| 295,350 | 3/1884 | Chapman | 43/42.2 |
| 967,660 | 8/1910 | Pedersen | 43/42.34 |
| 1,620,972 | 3/1927 | Hobbs | 43/42.2 |
| 2,598,965 | 6/1952 | Bain | 43/42.2 |
| 2,606,387 | 8/1952 | Garner | 43/42.51 |
| 3,789,536 | 2/1974 | Parmeson | 43/42.05 |

Primary Examiner—Gene P. Crosby
Attorney, Agent, or Firm—Mark C. Jacobs

[57] ABSTRACT

A fish attractor blade adapted to remain substantially stationary within the water after the fish strikes or grabs the hook and "runs" with the line through the water.

10 Claims, 5 Drawing Figures

FISH ATTRACTOR VARIABLE SPEED SLIDING ATTRACTOR BLADE

FIELD OF INVENTION

This invention pertains to the field of fishing lures or baits.

BACKGROUND OF THE INVENTION

Man has used fishing as a vocation and as a means for getting food from the very beginnings of time. Artificial lures, bait fishing, spinning, casting, etc. have grown into popular sports today. When one goes trolling and utilizes lures or baits, it has been found that lures that will reflect light have a definite influence on one's ability to catch fish. On the other hand, placing an attractor on the line in addition to a lure adds weight and resistance to the line being pulled by the fish and as such makes it more difficult for the fisherman to catch the fish, as the fish is unable to pull the added weight with him after the strike.

There is indeed a need, therefore, for as improved attractor blade that will both reflect the light and will permit the fish to pull directly on the line, which pull will be felt at the tip of the pole, thereby advising the fisherman of a strike.

It is an object of this invention to provide an attractor blade which exhibits a new and novel action as it moves through the water.

It is another object of this invention to provide an attractor blade that allows the fish to pull directly to the fishing pole tip.

It is a further object of the invention to provide a fish attractor that can be utilized at any speed from very slow of one-half (½) mph to very fast, namely five (5) miles per hour.

It is a further object to provide a fish attractor that moves through the water with little resistance.

Yet another object is to provide a fish attractor that is capable of rotation around the fishing line to reflect the sun's rays down into the water.

These and other objects of the present invention will become apparent and will in part be obvious to those of skill within the fishing art.

SUMMARY OF THE INVENTION

A fish attractor is disclosed having an elongated main body portion capable of rotation around the axis on an elongated, tubular member upon which it is mounted. A hollow rudder attachment is disposed at one end, namely the front or forward end, of the attractor in order to provide stability in the water. The attractor is configured such that as it moves through the water at any speed, it will rotate and since it is preferably provided with a reflective surface, the sun rays will be reflected down into the water thus hopefully attracting fish.

KNOWN PRIOR ART

Applicant is aware of the following references as a result of a search of the prior art:
U.S. Pat. No. 0,167,784: Pierce
U.S. Pat. No. 0,295,350: Chapman
U.S. Pat. No. 0,613,519: Junod
U.S. Pat. No. 0,967,660: Pederson
U.S. Pat. No. 1,062,980: Lewis
U.S. Pat. No. 1,678,448: Shannon
U.S. Pat. No. 2,086,008: Turner
U.S. Pat. No. 2,518,081: Lane
U.S. Pat. No. 2,940,204: Mehnert
U.S. Pat. No. 3,789,536: Parmeson
U.S. Pat. No. 4,134,224: Clark
U.S. Pat. No. 4,139,962: Gardyszewski

DESCRIPTION OF THE PREFERRED EMBODIMENT

Figure 1:
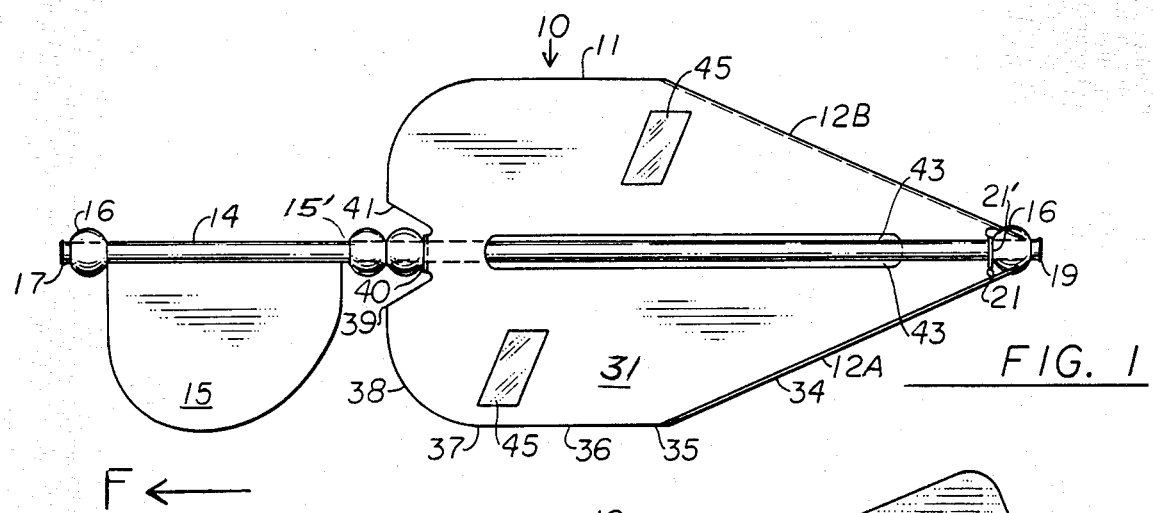
FIG. 1 is an elevational view of the instant device with the main body rotated to a vertical disposition.

Attractor blade 10 includes a main body portion 11 which comprises a pair of flat planar members 31 disposed on opposite sides of the hollow tube 14 which will be described in detail below. Planar panel member which consists of two mirror image interconnected segments commences at its rear with a first surface 21' normal to the elongation of said hollow tube 14. Member 31 diverges outwardly from the ends of surface 21' to a point 35, namely surface 34, then parallel forwardly in a straight surface 36 to point 37. The member 31 extends inwardly arcuately along surface 38 to a point 39 spaced from tube 14. The opposite side of member 31 is similar in configuration. A chamfer or diverging rearwardly surface commences at point 39 to a location spaced slightly from the tube. This rearwardly directed surface is designated as 41. At the basis of each 41's termination a tab 13 having a bore therein sized to receive the hollow tube 14 is disposed preferably integrally and about normal to said tubes.

Disposed along each surface 34 are a pair of fins 12A and 12B generally triangular in configuration. One of said fins is disposed upwardly, the other downwardly along surface 34. Preferably the fins are formed by folding planar member 31 so as to be integral, though they could be separately attached by conventional means. These fins are called turning fins since they rotate the body portion 11 in the water.

Planar member 31 also includes a central elongated axial slot 43, through which passes tube 14. Tube 14 is retained by a second tab 21 having a bore therein which second tab 21 is 180° oppositely directed from tab 13 but aligned with it and which 21 is about normal to the tube and disposed along rear first surface 21. Since the tabs are disposed normal to said tube 14, such that the tube 14 can pass through each of same and the elongated slot 43, the planar member can rotate around the tube due to the actions of the fins.

It is further seen that while the two tabs 13 and 21 are not quite normal to the tube, in order to avoid binding on rotation, the planar member 31 is disposed at end above and at one end below the hollow tube 14. See FIG. 2.

The elongated tube 14 is sized to fit through the circular tabs 13 and 21 each of which encircle the tube. Said tube further includes a pair of spacing beads at each end of said tube, said tube generally being of plastic or glass, which beads are held on said tube by the flared tube ends 17 and 19, 17 being the forwardly positioned end. At least one and preferably a pair of the spacer beads are disposed on said tube behind the main body portion 11 to the front of the punched tab 13. One of said beads is disposed between points 38 and 40 to prevent the main body portion from moving frontwardly along the length of the tube. Adequate space is provided between the bead and the angularly disposed leading surface 41 of the main body portion to permit rotation about said tube 14. Such beads are fixedly secured as by being pressed on or glued on by an adhesive. A forwardly disposed rudder 15 is downwardly disposed along said tube and is disposed between the most forward spacer bead and the intermediate spacer bead(s) in front of the main body portion 11. Said rudder is either secured along the outer edge of said tube or said tube may be grooved to receive said rudder. The rudder may be made of plastic or metal. If metal similar to the tube is employed, obviously spot welding as well as an adhesive may be employed to secure the rudder to the tube.

In the version shown in FIG. 1, an elongated space has been cut into each of the sections 31 in order to have minimum area in contact with the elongated tube to ensure easy rotation about the horizontal axis.

Note also that in FIG. 1 the two parallelogram shaped areas 45 represent typical zones that can be overcoated with prismatic material to reflect the sun.

It is seen that the attractor blade of this invention can be pulled through the water are variable speeds with little or no resistance. During such time as the blade is moving, the currents act as a fluid thereby causing the device to rotate as it moves along during the trolling period. Optionally, reflective zones such as those designated 45 and shown in FIG. 1 may be placed on opposite sides of the sections 31 in order to reflect the light during rotation. Optionally the two body sections may be made of a reflective metal such as aluminum, chrome plated steel, polished brass or anodized aluminum. These moving sun rays help attract fish to the line.

It is seen that the attractor blade of this invention is so constructed that the fishing line extends through the central tube forming part of the attractor blade. Thus the fish, when he strikes or bites, is free to pull the line without moving the attractor blade relative to its location at the point of strike in the water. Thus any pull on the line by the fish will be readily recognized by a bending of the tip of the fishing pole thereby signifying a strike to the fisherman.

The device of the instant invention may be made in several sizes from small for trout to large for salmon.

Other reflective and polished portions such as the fins may be of materials such as brass, chrome, stainless steel, lenticular plastic and prismatic plastic.

In the instant construction, it has been noted that there is a cut out elongated section, previously referred to as 43. This cut out permits water to flow through the device and thereby minimize drag.

Should one desire to speed up or slow down the rotation of the device about the central tube, a mere changing of the angle of the fins disposed along leading edges 12A and B will speed up or slow down the device. The greater the angle, up to 45°, the faster the rotation through the water.

Figure 4:
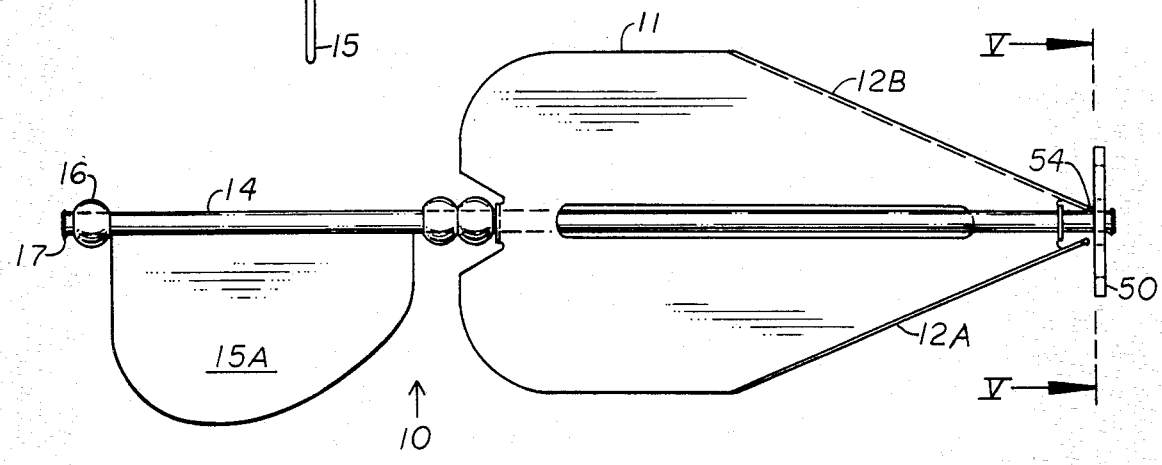
FIG. 4 is a view similar to FIG. 1 but illustrating a second embodiment.
Figure 5:
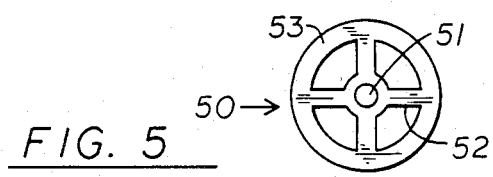
FIG. 5 is a front elevational view of a portion of the embodiment of FIG. 4.

In a modified version of the instant device, as seen in FIGS. 4 and 5, the rearmost spacer bead is replaced by a spoked wheel configured sonic disc. The disc 50 of a cross section diameter relative to the sizing of the balance of the device can vary from about one-half (½) inch to one and one-half (1½) inches. The tubular member is inserted in the hub opening 51 prior to the flaring of the tube ends.

Disc 50 also includes a plurality of spokes 52 as well as the outer wheel 53.

In view of the close proximity of the main body portion 11 to disc 50 as the body portion rotates in the water the end tips thereof 54 will impinge upon the disc causing a vibratory sound. The impingement of tips 54 is insufficient to prevent rotation. It is more in the nature of a momentary snag during the rotational process. Disc 50 should preferably be made of metal.

In this embodiment, it may be beneficial to employ a larger rudder to prevent the tube from rotating on the fishing line than is employed in the standard version, i.e., the first embodiment. This is shown in FIG. 4.

Figure 2:
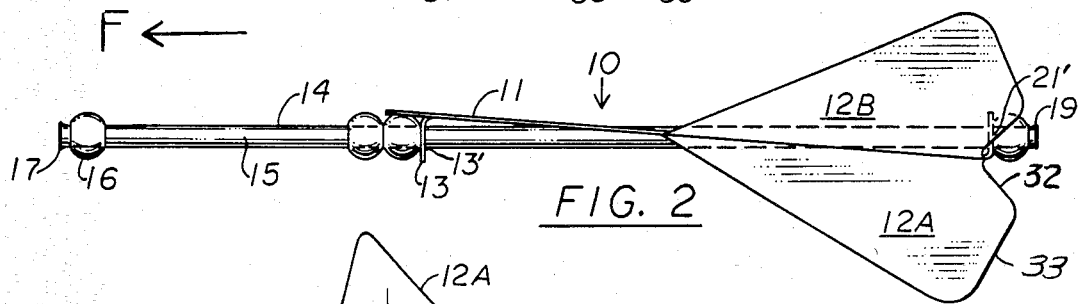
FIG. 2 is a bottom plan view.
Figure 3:
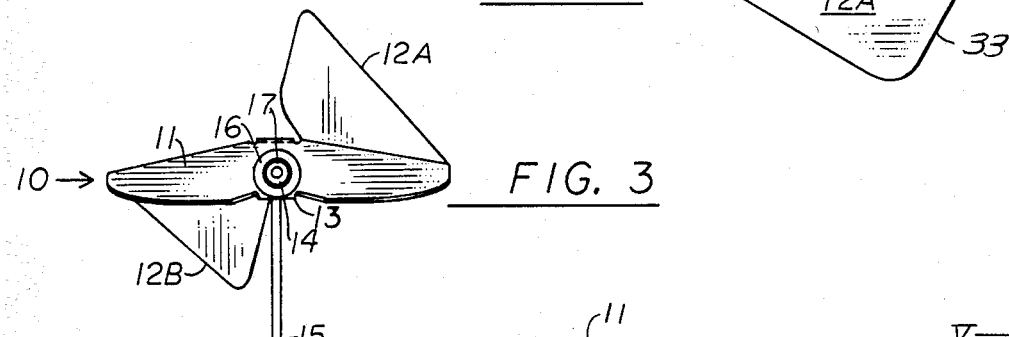
FIG. 3 is a front elevational view thereof.

Since the remainder of this embodiment is the same as discussed with respect to FIGS. 1-3, such discussion need not be repeated.

Obviously, it is recognized that the attractor blade of this invention can be used with any kind of fishing line just so that the line can be fed easily and speedily through the central tube.

In order to utilize the instant device, the fisherman merely slides the fishing line through the hollow, elongated tube through the front flare and then ties a large swivel to the end of the fishing line at that rear point. This secures the attractor blade on the line but allows the blade to slide free on the line. Lure or bait is then attached in the conventional manner to the swivel. Any type of hook or lure may be employed as may be desired.

It is seen that the instant device may be made of plastic or metal and that the surface can be left plain, made textured as with a striated design for example, or covered with a prismatic shining metal overlayer that will readily capture the sun's rays. The device can be made in all sizes suitable for the attraction of variously sized fish.

Obviously another receiving means such as a return washer can be employed to maintain the various components upon the hollow tube, in place of flared ends.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A fish attractor blade adapted to be used with lures or bait and to be disposed upon a fishing line, which comprises:

an elongated hollow tubular member having a component securing means at opposite ends thereof, a forward rudder blade depending outwardly from said tubular member, a pair of spaced bore centering tabs disposed on said tubular member, a main body portion having a front end and a back end, comprised of two mirror image, spaced horizontally, aligned planar segments interconnected at opposite ends thereof to form a planar member; one end of each of which is mounted upon the first of said tabs, at the front, and the back end is mounted 180° opposed on the second of said centering tabs to provide an angular disposition relative to said tabs, each planar segment having an inwardly depending trailing edge, each side of the planar member having an oppositely disposed triangular turning fin, one of which is disposed upwardly and the other downwardly from the respective trailing edges of the said segments of the planar member.

2. The fish attractor of claim 1 wherein the rudder is separated from the main body portion by at least one spacer bead.

3. The attractor blade of claim 2 wherein the component securing means comprises a flare at each end of the tubing.

4. The attractor blade of claim 3 including a spacer bead interposed between the flare at each end and the rudder at one end and the main body portion at the other end.

5. The attractor blade of claim 4 wherein the main body portion's planar segments each have a front edge extending normal to the length of said tube, said front edge curving rearwardly to a second edge that depends rearwardly parallel to said tube to a point of junction to a third edge that depends rearwardly and inwardly to a point in parallel alignment to the point of commencement of the first edge.

6. The attractor blade of claim 1 wherein the segments have prismatic portions in part and at least on one surface.

7. The attractor blade of claim 1 wherein the device is made of plastic.

8. The device of claim 5 wherein the front edge is chamfered adjacent the tube.

9. In the device of claim 4 wherein the most rearwardly spacer bead is replaced by a sonic disc.

10. In the device of claim 9 wherein the sonic disc is of a spoked wheel configuration and is made of metal.

* * * * *